April 15, 1969  J. C. PARKS, JR., ET AL  3,438,243
PROGRAMMED GAS CHROMATOGRAPHY SYSTEM
Filed May 2, 1966

INVENTORS
James C. Parks, Jr.
Huel C. Tucker

BY
*M. N. ____*

ATTORNEY

United States Patent Office 3,438,243
Patented Apr. 15, 1969

3,438,243
PROGRAMMED GAS CHROMATOGRAPHY SYSTEM
James C. Parks, Jr., Kemah, and Huel C. Tucker, Texas City, Tex., assignors to Monsanto Company, St. Louis, Mo., a corporation of Delaware
Filed May 2, 1966, Ser. No. 547,016
Int. Cl. G01n *31/08*
U.S. Cl. 73—23.1                                   5 Claims

ABSTRACT OF THE DISCLOSURE

A process gas chromatographic system having an electronic controller for effectuating continual cyclic temperature programming, said system employing a vortex tube device for rapid cool-down of the chromatographic column between sample injections.

---

The present invention relates to programmed temperature gas chromatographic analysis. More particularly, the present invention relates to an apparatus and means for the continuous cyclic temperature programming of a process gas chromatograph.

Gas chromatographic analysis is the process of separating the components in a gaseous mixture by passing the mixture through a chromatographic column in a carrier stream of gas to separate the components of the mixture and then detecting and measuring the components of the mixture as they are eluted from the chromatographic column. Conventional separations by gas chromatography are usually effected at a constant chromatographic column temperature. However, with mixtures of components having a wide range of boiling points, separation of the various components is not very satisfactory under such constant temperature conditions. Thus, the resulting analysis leaves much to be desired. Improved separation is obtained when the temperature is gradually increased during the time of passage and elution of the components of the mixture through and from the chromatographic column. In many instances even better separations can be achieved by increasing the temperature in a nonlinear pattern rather than in a linear pattern. The use of such nonlinear temperature increase with respect to the time permits the separation, detection and measurement of substantially all of the members of a homologous series. If such a linear or nonlinear chromatographic column temperature increase is to be used in gas chromatography, then the sample to be analyzed, the starting temperature and the temperature increase portion of the chromatographic column temperature versus the time profile must be accurately reproducible from analysis cycle to analysis cycle in order for one sample to be compared with another.

In the past, methods have been devised for gradually raising the temperature of the chromatographic column such as by manually or mechanically varying the current to a column heating device. However, these methods have been largely restricted to the laboratory and are not satisfactory for industrial process use because of the number of samples that must be analyzed within a relatively short period of time. As was pointed out previously, the column temperature must be the same at the start of each run as well as the same at any given time during a sample analysis as compared to the column temperature at that same time during another sample analysis. One of the major drawbacks in the prior art is the method of cooling the column after the temperature has been increased during a sample analysis and readjusting it to the desired starting temperature. The temperature decrease portion of the time versus chromatographic column temperature profile, that is, the cooling of the column between samples, must be at a minimum in order for temperature programming of a process chromatographic to be practical.

It is an object of the present invention to provide an apparatus for chromatographic analysis whereby accurate reproduction from analytical cycle to cycle of the time versus temperature profile of a chromatographic column may be obtained.

It is a further object of the present invention to provide a means for rapidly cooling a chromatographic column. It is also an object of the present invention to provide a chromatographic system suitable for industrial use.

Other objects will become apparent to those skilled in the art from the description below of the present invention.

These and other objects are accomplished by the present invention which in one of its embodiments is a chromatographic analytical apparatus comprising, in combination (1) a gas analysis system comprising at least one chromatographic column, means for passing a stream of carrier gas through said chromatographic column, gas sampling means for collecting and injecting a predetermined amount of sample gas into said carrier gas stream as a means of applying said sample gas to said chromatographic column, means for detecting and measuring the quantitative values of preselected components of said sample in the effluent of said chromatographic column, (2) a heating and cooling means for controlling the temperature of said chromatographic column, (3) a programmer for controlling the gas analysis system functions and the heating and cooling means so as to continuously give a reproducible profile from analysis cycle to analysis cycle of time versus chromatographic column temperature, said programmer comprising a timing device and an electronic circuit, said electronic circuit containing an integrator circuit and a temperature controller circuit, said integrator circuit being capable of integrating with respect to time any voltage supplied to it and thereby generating an output voltage which is proportional to the integral with respect to time of the input voltage, said temperature controller circuit comprising a differential amplifier and a thermocouple, said thermocouple being located so as to accurately reflect the temperature of said chromatographic column, said differential amplifier amplifying the difference between the E.M.F. generated by said theremocouple and the output voltage of said integrator circuit so as to activate said heating means or cooling means in such a manner as to cause the E.M.F. generated by said thermocouple to be equal to the output voltage of said integrator circuit.

Figure 1:
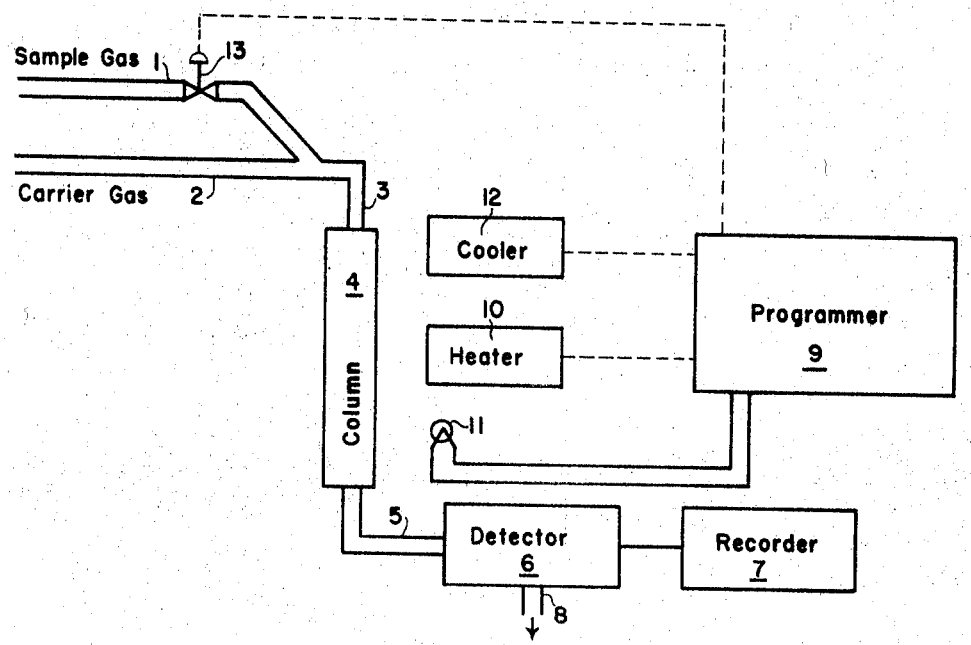
FIGURE 1 is a block diagram of the programmed temperature chromatographic analysis apparatus of the present invention.

Referring to FIGURE 1, a sample to be analyzed is passed by line 1 into admixture with a carrier gas carried by line 2. The resulting mixture then passes through line 3 to chromatographic column 4. Within chromatographic column 4, the sample is passed over a suitable separating material whereby the sample is separated into its various components. As the gas stream exits from column 4, it passes through line 5 to detector 6 in which the sample components within the gas stream are detected and measured. Detector 6 sends a signal, usually an electric current, to recorder 7, the signal being proportional to the concentration of the component in the effluent from column 4. The gas then exits from detector 6 by gas vent 8. Controlling all of the functions of the foregoing described chromatographic analysis system is programmer 9 which operates heater 10 for column 4 and which is responsive to thermocouple 11. The programmer 9 also controls a cooler 12 for column 4 and sample valve 13 which determines how much sample is to be analyzed and at what time. The heater 10 and cooler 12, of course, will be placed in such a manner as to heat or cool the column. Likewise, the thermocouple 11 will be placed so as to accurately reflect the temperature of column 4.

Many of the elements of the apparatus of the present invention may be those conventionally employed. The prior art describes many valve arrangements for injecting a sample into a chromatographic column as well as many types of chromatographic columns. For example, it is known in the prior art to use a plurality of columns which may be connected in series. Likewise, numerous detecting and recording means are known and are a matter of choice to the user. The detecting device is usually a thermal conductivity detector cell; however, any suitable detecting device can be used that is capable of utilizing some property of the detected component to create a signal, usually an electric current, proportional to the concentration of that component in the effluent. Other detecting devices include gas density balances, radiological ionization detectors, and hydrogen flame detectors. The recording means will usually be a strip chart recorder; however, the presentation of a chromatographic analysis on the strip chart may be in the form of peaks or a bar graph.

The heating and cooling means employed may be of various various types. For example, the heating means for the chromatographic column may be located in the walls of the chamber containing the chromatographic column or even in the chamber itself. In either case, air will usually be circulated within the oven. A low mass electric air heater may also be advantageously employed wherein air is heated at a point outside the chamber and then circulated therethrough. The cooling means may consist in merely opening the door of the chamber containing the chromatographic column and cooling the column with a fan. Compressed air or water may also be used to cool the chromatographic column. However, it has been found that the use of a vortex tube cooler gives unexpectedly good results in cooling a chromatographic column and is a preferred cooling means. The vortex tube cooler permits very rapid cooling of the chromatographic column between samples so as to facilitate the frequent sample analyses required in industrial process use. The vortex tube is a small instrument without moving parts that converts compressed air into hot and cold air. The air first enters holes that inject it tangentially into the tube at sonic speed and creates a cyclone spinning at about a million revolutions per minute. The center of this vortex is cold air that flows out one end of the tube while the rest of the air churns down toward the other end of the tube and grows hot.

When the samples being analyzed have a wide boiling point range, it is important to maintain the detector at a temperature above the maximum temperature reached by the chromatographic column. This prevents the high boiling point components from condensing within the detector.

Although only one column is shown in FIGURE 1, in actual practice a second chromatographic column generally will be present as a reference column. Both the column used as a reference column and that used for analysis will be operated under identical conditions. Carrier gas will be made to flow through the reference column at the same rate as through the analysis column which receives the sample. A reference detector the same as detector 6 also will be present for the reference column. It is important that the carrier gas flow be constant and the same with respect to temperature and time through both the reference column and the analysis column in order for samples to be compared with each other.

Figure 2:
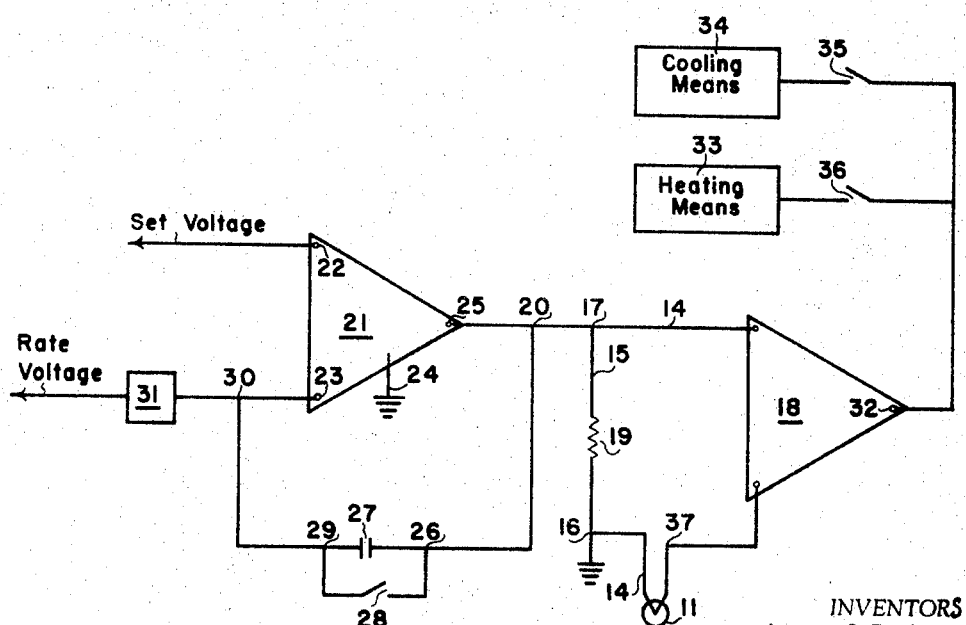
FIGURE 2 is a diagram of an electronic circuit which provides for accurate reproduction of the time versus column temperature profile of a chromatographic column.

FIGURE 2 is a schematic diagram of the basic elements of an electronic circuit which, together with other parts of a programmer such as a timing device will provide either a constant chromatographic column temperature, a linearly varying chromatographic column temperature or a nonlinearly varying chromatographic column temperature. This electronic circuit comprises a parallel circuit having two branches 14 and 15 connected to two common junctions, 16 and 17. Branch 14 of this parallel circuit contains a thermocouple 11 and a differential amplifier 18 connected in series and branch 15 contains resistor 19. The differential amplifier may be either a current amplifier or a voltage amplifier. One junction 16 of this parallel circuit is connected to a common reference voltage such as ground, the other junction 17 having a voltage, either plus or minus with respect to junction 16, and being connected to junction 20. The part of the electronic circuit which has been described thus far is referred to hereafter as the temperature control portion of the electronic circuit, the remainder of the circuit being for supplying a voltage to junction 20, which voltage can be made to be constant, to vary linearly, or to vary nonlinearly with respect to time. This remaining part of the circuit is referred to hereafter as the voltage control portion of the electronic circuit and is an integrator circuit.

Still referring to FIGURE 2, the circuit contains differential operational amplifier 21 having two input terminals 22 and 23. One of the input terminals 22 is connected to a voltage indicated as the set voltage. The differential operational amplifier 21 is grounded or connected to some common reference voltage by line 24 and the output 25 of the differential operational amplifier has by its nature the same polarity with respect to the common reference voltage at point 24 as the input terminal 22 has with respect to the voltage at input terminal 23. The junction 20 is also connected to one of the common junctions 26 of a parallel circuit containing a capacitor 27 in one branch of this parallel circuit and a switch 28 in the other branch of the parallel circuit as a means for by-passing the capacitor 27. The other common junction 29 of the parallel circuit leads to a junction 30. Junction 30 is connected to the input terminal 23 and also to a linear or nonlinear element 31. This element 31 is connected to a voltage supply indicated as the rate voltage. The output 32 of the differential amplifier 18 activates either a heater circuit 33 or a cooler activation circuit 34, depending on whether switch 35 or switch 36 is open. The set voltage and rate voltage have been so designated because the set voltage determines the starting temperature or base temperature to be used in a chromatographic analysis while the rate voltage influences the rate of change of temperature desired during an analysis.

It is to be understood that the electronic circuit shown in FIGURE 2 shows only the basic elements required. For a given situation, many minor modifications can be made. For example, resistors can be placed at various places, such as between junctions 17 and 20 or between junction 17 and differential amplifier 18, in order to modify the voltage or current to a desired value. Switches can, of course, be placed throughout the circuit. Not shown on the drawing is the power supply required for the two amplifiers. Also though only a single piece of equipment is shown for the differential operational amplifier 21, it is to be understood that this term includes any circuit which acts in effect like a differential operational amplifier. For example, the output of the differential operational amplifier can be connected to an emitter follower or other current boosters in order to boost the current.

In actual operation, thermocouple 11 will be placed such as to accurately reflect the chromatographic column temperature to the electronic circuit. The thermocouple 11 generates an E.M.F. depending on its temperature—the hotter it is, the more voltage it generates. In the circuit shown in FIGURE 2, the voltage at junction 17 is regulated so that when the thermocouple 11, and thus the chromatographic column, is at the desired temperature, then the voltage at a point 37 which may be any point between thermocouple 11 and differential amplifier 18 will be the same as that at junction 17. For example, the voltage at junction 17 will usually be about 2 to 8 millivolts for temperatures of 50° C. to 150° C. The voltage generated by the thermocouple 11, which for example is about 55 microvolts per centigrade degree for iron-constantan thermocouple, will be the same as that supplied to junction 17. Under such conditions, it is desired that the column heating means 33 and column cooling means 34 be off. Should the voltage at junction 16 be higher than that at junction 17, current will tend to flow from junction 16 through branch 15 to junction 17. However, no current will flow between point 37 and junction 17 because they have the same voltage, thus no current is going through the differential amplifier 18. However, if it is assumed that the column temperature and the thermocouple 11 temperature goes below the desired temperature level, then the voltage at point 37 will be less than that at junction 17, thus causing current (hereafter called error current) to flow from junction 17 through the differential amplifier 18 to point 37. Should the differential amplifier 18 be a current amplifier, then the error current is amplified by differential amplifier 18 and, assuming switch 36 is closed and switch 35 is open, by some means such as a switch activates the heater circuit 33 thus turning on column heating means 33 so that the column temperature rises to the desired level. At this point current will cease to flow through the differential amplifier 18 and the column heater will turn off. Of course, error current can also be made to operate the cooler for the chromatographic column in a similar manner.

From the foregoing paragraph it is seen that the heater column heating means and column cooling means can be made responsive to the voltage at junction 17. If this voltage at junction 17 is constant, then the temperature control circuit will provide a substantially constant chromatographic column temperature. However, if the voltage at junction 17 is varied in a linear or nonlinear manner, it can be seen that the column temperature will also vary in a linear or nonlinear manner, respectively. It is the function of the voltage control portion of the electronic circuit shown in FIGURE 2 to vary the voltage supplied to junction 17 in the desired manner.

Still referring to FIGURE 2, a constant voltage is supplied as the set voltage and a different voltage which is higher than the set voltage is supplied as the rate voltage. When the rate voltage is constant and element 31 is a linear element such as a resistor and switch 28 is open as shown in FIGURE 2, then due to the nature of the circuit it will integrate the voltage supplied to it and the voltage at junction 20 will increase linearly with respect to time. The voltage at junction 17 under the foregoing set of conditions will also increase linearly with respect to time. The voltage at junction 17 under the foregoing set of conditions will essentially follow the equation $$E_{17} = \frac{(E_{Set} - E_{Rate})(\text{Time})}{RC} + E_{Set}$$

where $E_{17}$ = voltage at junction 17
R = resistance of element 31
C = capacitance of capacitor 27

Since all the variables except the time are constant, then it is readily apparent that the voltage at junction 17 is directly proportional to time and will thus increase linearly at a constant rate as long as switch 28 is open. If one were to place several different size resistors in parallel for element 31 with a timing device to switch from one resistor to another at the desired time, then it can be seen that the voltage at juncion 17 could be made to linearly increase at a different rate by switching to a different size resistor. It can be made to decrease by switching to a different rate voltage.

A switch can be placed between element 31 and junction 30. When this switch is opened, then the voltage which is at that time being supplied to junction 17 will remain constant at that value. Thus the time versus temperature curve can be made to increase for a period of time to a desired temperature then to remain constant at that temperature for a period of time by opening the switch between element 31 and junction 30. If enough resistors and switches are present, almost any time versus tempertaure curve can be obtained.

If a rate voltage is supplied which varies nonlinearly or if the rate voltage is constant and a nonlinear element such as a function generator is used for element 31, then the voltage control portion of the electronic circuit will supply a voltage to junction 17 which voltage increases nonlinearly with respect to time.

Figure 4:
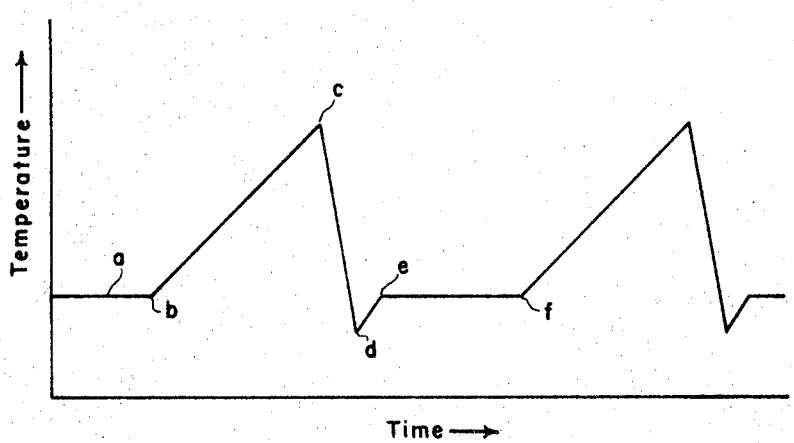
FIGURE 4 is a time versus temperature profile for a chromatographic column during two typical analysis cycles. The same reference characters are used in all the figures to denote like components.

As was pointed out previously, the electronic circuit shown in FIGURE 2 does not alone control the chromatographic column temperature but is coupled with a timing device which controls all the gas analysis system functions, the electronic circuit functions and may independently of the electronic circuit control the cooling means and/or the heating means. For most systems, a time versus temperature profile will be desired in which there is a period of constant temperature, a period of rising temperature, and a period of falling temperature such as is shown in FIGURE 4. The sample to be analyzed will probably be injected at the start of the rising temperature and will have migrated through the column when the temperature has risen to a maximum and begins to fall. In order to obtain such a time versus temperature profile, reference is now made to FIGURE 4 for a sequential operation of the electronic circuit of FIGURE 2. It will be assumed for this illustration that the starting or base temperature at point $a$ of FIGURE 4 is higher than ambient temperature. Starting at point $a$, switches 28 and 36 are closed and switch 35 is open. The temperature remains constant until point $b$ when a timing device in the programmer (not shown in FIGURE 2) opens switch 28 so as to start the column temperature rising and at the same time the timing device operates the sample valve 13 of FIGURE 1 so as to inject the sample into the chromatographic column. The temperature then rises for a predetermined amount of time during which the sample is migrating through the chromatographic column. At point $c$, the timing device in the programmer closes switch 28, opens switch 36, and at the same time turns on the column cooling means so as to cool the column to or below the starting temperature. The cooling means stays on for a predetermined time and at point $d$ the programmer turns off the cooling means and closes switch 36, switch 28 remaining closed. As the column temperature is now below the desired starting temperature, the column heater will be turned on automatically by the electronic circuit and will remain on until the starting temperature at point $e$ is reached. After the desired starting temperature is reached at point $e$, the electronic circuit will hold the temperature constant and at point $f$, which is a predetermined time after point $d$, the timing device in the programmer will again open the sample valve so as to inject a sample into the chromatographic column and at the same time open switch 28 so as to start the column temperature rising, etc. The time elapsed between points $c$ and $d$ needs only to be long enough to cool the column to the desired level and the time elapsed between points $d$ and $f$ needs to be only long enough to allow the temperature to adjust to the desired starting temperature. In the foregoing illustration, switch 35 remained open the entire time and the cooling means for the chromatographic column was operated directly by the timer. If the analysis of a sample required subambient temperatures, then it can be readily seen that the electronic circuit could be used to control the column cooling means so as to maintain the desired subambient temperature.

Figure 3:
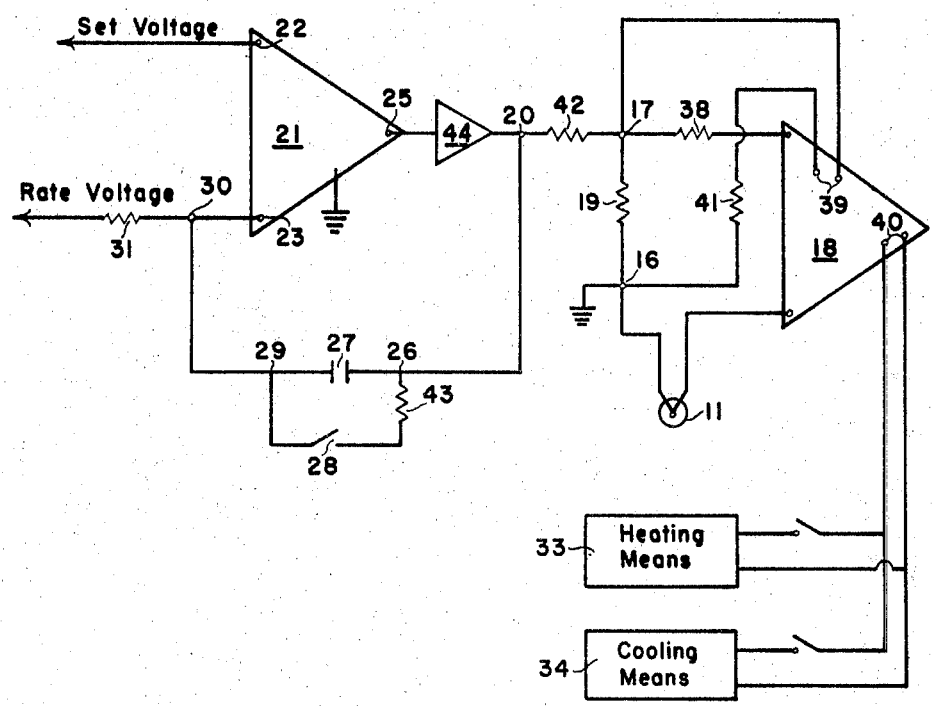
FIGURE 3 is a diagram of another and preferred electronic circuit which provides for accurate reproduction of the time versus column temperature profile of a chromatographic column.

Another and preferred embodiment of the electronic circuit for controlling the chromatographic column temperature may be seen in FIGURE 3. The temperature control portion of the electronic circuit consists of a parallel circuit having three branches connected to two common junctions 16 and 17. One of the branches contains resistor 19 of 10 ohms while a second of the branches contains thermocouple 11, resistor 38 of 100 ohms and a current amplifier 18. The current amplifier is a Model 301 Industrial "Acro-Relay" manufactured by Acromag, Inc. This current amplifier has a DC control sensitivity of one-thousands of a microwatt and a DC sensitivity of one millivolt and one microampere into a 1000 ohm input coil. The Model 301 consists of three stages. The controlling signal drives a toroidal magnetic amplifier that drives a second stage trigger amplifier. The trigger amplifier delivers about ¼ watt to an 8.0 ampere output relay so as to activate relay switches 39 and 40 built into the Model 301.

The third branch of the parallel circuit contains a resistor 41 of 10 ohms and switch 39 which, as pointed out before, is activated by the input to the current amplifier. The input to the current amplifier also activates the relay switch 40 which turns either the heater circuit 33 or the cooler circuit 34 off and on.

Still referring to FIGURE 3, junction 16 is connected to ground and junction 17 is connected through a resistance 42 of 1000 ohms to junction 20. Attached to junction 20 is one junction of a parallel circuit containing a capacitor 27 having a capacitance of 40 microfarads in one of the parallel branches and a switch 28 and resistor 43 of 1500 ohms in the other parallel branch. The other junction of the immediately foregoing parallel circuit attaches to a junction 30 which is connected to one of the input terminals 23 of a differential operational amplifier 21 and is also connected to a rate voltage through a resistance 31 of ten millions ohms. The differential operational amplifier is a Philbrick P2 solid state differential amplifier which has a gain of 40,000 and an output range of ±10 volts at 1.0 milliamps with the power requirement of ±15 volts DC at less than 11 milliamps. One input terminal 22 of the differential operational amplifier 21 is connected to a set voltage. The set voltage ranges from —5 volts to +5 volts with respect to ground and the rate voltage ranges from the set voltage to five volts higher than the set voltage.

The output at 25 of the differential operational amplifier 21 goes to a current booster amplifier 44 which in this particular embodiment is a Philbrick Model P5. The Model P5 which has an output of 20 milliamps up to ±10 volts DC provides a twenty-fold increase of the current output of the differential operational amplifier. The output of the current booster amplifier goes to junction 20.

The following example is given to demonstrate but not to limit the present invention.

EXAMPLE

In a specific embodiment of the present invention, a Greenbriar 818 chromatograph was used which had been modified to provide three separate temperature controlled compartments. One of these compartments was maintained at about 75° C. and contained the gas sample valve. Another of these compartments was maintained at approximately 315° C. and contained both the detector for the sample stream and the reference detector. The third and remaining compartment contained both the chromatographic column which was to receive the sample and the reference column. Each column was constructed from ten feet of ⅛-inch stainless steel tubing and was packed with 10% DC–710 Silicone Oil on a Chromasorb-P support. Chromasorb-P is a diatomaceous silica support having a B.E.T. surface area of 4–6 square meters per gram. The temperature of the third compartment containing the chromatographic columns was controlled according to the present invention so as to provide a constant starting temperature of 55° C. with a linear increase in temperature to 280° C. over a fifteen minute period. The third compartment was then cooled to 18° C. in six minutes and then lined out to the starting temperature of 55° C. in nine minutes. Thus one sample could be analyzed every thirty minutes.

The cooling means for the third compartment consisted of a vortex tube cooler which had a capacity of 2 cubic feet per minute at 100 p.s.i. and the heating means consisted of a low mass electric air heater.

The electronic circuit used to regulate the temperature of the third compartment was that of FIGURE 3 as described above with a set voltage of plus one volt with respect to ground and at a rate of plus four volts with respect to ground.

This system analyzed an essentially hydrocarbon stream having thirty-eight components in the $C_4$ to $C_{12}$ range.

What is claimed is:

1. A chromatographic analytical apparatus comprising, in combination, (1) a gas analysis system comprising at least one chromatographic column, means for passing a stream of carrier gas through said chromatographic column, gas sampling means for collecting and injecting a predetermined amount of sample gas into said carrier gas stream as a means of applying said sample gas to said chromatographic column, means for detecting and measuring the quantitative values of preselected components of said sample in the effluent of said chromatographic column, (2) a heating and cooling means for controlling the temperature of said chromatographic column, (3) a programmer for controlling the gas analysis system functions and the heating and cooling means so as to continuously give a reproducible profile from analysis cycle to analysis cycle of time versus chromatographic column temperature, said programmer comprising a timing device and an electronic circuit, said electronic circuit comprising (a) a first parallel circuit having at least two branches connected to a first and second common junction, one branch containing a thermocouple and a differential amplifier in series and at least one other branch containing a resistor, said first junction being connected to a common reference voltage and said second junction having a voltage with respect to said reference voltage; and (b) a circuit comprising a differential operational amplifier connected to said common reference voltage having a first and second input terminals, the first input terminal of said differential operational amplifier being connected to a first voltage, the output of said differential operational amplifier having the same polarity with respect to said common reference voltage as said first input terminal has with respect to said second input terminal and being connected to a third junction, said third junction also being connected to said second junction and also to one of the two common junctions of a second parallel circuit having at least two branches, one of the branches containing a capacitor and the other branch containing a means for bypassing said capacitor, the other common junction of said second parallel circuit being connected to a fourth junction, said fourth junction being connected to the second input terminal of the differential operational amplifier and also being connected through an element, which element is linear or nonlinear, to a second voltage which is greater than the voltage of said first input terminal of said differential operational amplifier.

2. The apparatus of claim 1 wherein said element is a resistor and said second voltage is constant.

3. The apparatus of claim 1 wherein said first parallel circuit contains three branches, one branch containing said differential amplifier and said thermocouple, one branch containing a resistor, the other branch containing a resistor and a switch in series, the switch being responsive to the output of said differential amplifier, said differential amplifier being a current amplifier.

4. The apparatus of claim 2 wherein the heating means is activated by said current amplifier and said cooling means is activated by said timing device.

5. The apparatus of claim 1 wherein the cooling means is a vortex tube cooler.

References Cited

UNITED STATES PATENTS

| 3,301,482 | 1/1967 | Bullen | 236—46 |
| 3,232,093 | 2/1966 | Burow et al. | 73—23.1 |
| 3,165,149 | 1/1965 | Raible et al. | 165—30 |

OTHER REFERENCES

C. D. Lantz, "Temperature Programming in Gas Chromatography," Instruments and Control Systems, vol. 38, August 19, 1965, pp. 93–94.

JAMES J. GILL, *Primary Examiner.*

V. J. TOTH, *Assistant Examiner.*